United States Patent
Santiquet et al.

(10) Patent No.: US 10,210,304 B2
(45) Date of Patent: Feb. 19, 2019

(54) METHOD AND SYSTEM FOR DESIGNING AN ASSEMBLY OF OBJECTS IN A SYSTEM OF COMPUTER-AIDED DESIGN

(75) Inventors: Laurent Santiquet, Bouc-Bel-Air (FR); Bertrand Faure, Boulougne Billancourt (FR)

(73) Assignee: Dassault Systèmes, Velizy Villacoublay (FR)

( * ) Notice: Subject to any disclaimer, the term of this patent is extended or adjusted under 35 U.S.C. 154(b) by 330 days.

(21) Appl. No.: 13/597,179

(22) Filed: Aug. 28, 2012

(65) Prior Publication Data

US 2013/0226529 A1   Aug. 29, 2013

(30) Foreign Application Priority Data

Sep. 8, 2011 (EP) .................................... 11306115

(51) Int. Cl.
*G06F 17/50* (2006.01)
*G06T 19/00* (2011.01)
*G06T 17/10* (2006.01)

(52) U.S. Cl.
CPC .......... *G06F 17/5086* (2013.01); *G06F 17/50* (2013.01); *G06T 17/10* (2013.01); *G06T 19/00* (2013.01); *G06F 2217/06* (2013.01); *G06T 2219/004* (2013.01)

(58) Field of Classification Search
CPC ... G06F 17/50; G06F 17/5004; G06F 2217/06
USPC ...................................................... 703/1, 2
See application file for complete search history.

(56) References Cited

U.S. PATENT DOCUMENTS

2003/0023947 A1*   1/2003   Sakakura et al. ............... 716/17

FOREIGN PATENT DOCUMENTS

EP   1 672 549    6/2006
JP   H11345258   12/1999

OTHER PUBLICATIONS

European Search Report in European Application No. EP 11306115 (dated Feb. 14, 2012).
Bazargan, K., et al., "Specifying the Representation of Non-geometric Information in 3D Virtual Environments" Human-Computer Interaction. Part II, pp. 773-782 (Jul. 19, 2009).
Gotzelmann, T., et al., "Form Follows Function: Aesthetic Interactive Labels", Computational Aesthetics in Graphics, Visualization and Imaging, pp. 1-8 (Jan. 1, 2005).

(Continued)

*Primary Examiner* — David Silver
(74) *Attorney, Agent, or Firm* — Hamilton, Brook, Smith & Reynolds, P.C.

(57) ABSTRACT

A computer-implemented method and apparatus of designing an assembly of objects in a system of computer-aided design. The method/apparatus provides a three-dimensional geometrical modeled object comprising at least one three-dimensional geometrical element; provides a logical modeled object comprising at least one logical component; and associates sets of at least one three-dimensional geometrical element with respective sets of at least one logical component. The method/apparatus display in a three-dimensional scene, a representation of a set of at least one logical component partially superimposed on the corresponding associated set of at least one three-dimensional geometrical element.

18 Claims, 10 Drawing Sheets

(56) References Cited

OTHER PUBLICATIONS

Bazargan, K., et al. "Specifying the Representation of Non-geometric Information in 3D Virtual Environments", CUI—University of Geneva, Human-Computer Interaction, Part II, HCII, pp. 773-782, 2009.

* cited by examiner

METHOD AND SYSTEM FOR DESIGNING AN ASSEMBLY OF OBJECTS IN A SYSTEM OF COMPUTER-AIDED DESIGN

RELATED APPLICATION(S)

This application claims priority under 35 U.S.C. § 119 or 365 to Europe, Application No. 11306115.4, filed Sep. 8, 2011. The entire teachings of the above application are incorporated herein by reference.

BACKGROUND OF THE INVENTION

The invention relates to the field of computers programs and systems, and more specifically to the field of designing of an assembly of object in a Computer-Aided Design application.

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systèmes under the trademark CATIA. These CAD systems allow a user to construct and manipulate complex three dimensional or 3D models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects; the typical size of a file representing an object in a CAD system being in the range of one Megabyte per part, and an assembly may comprise thousands of parts. A CAD system manages models of objects, which are stored in electronic files.

In computer-aided techniques, the graphical user interface GUI plays an important role as regards the efficiency of the technique. Most of the operations required for manipulating and/or navigating the modeled objects may be performed by the user (e.g. the designers) on the GUI. Especially, the user may create, modify, and delete the modeled objects forming the product, and also explore the product so as to comprehend how modeled objects are interrelated, e.g. via a product structure. Traditionally, these operations are carried out through dedicated menus and icons which are located on the sides of the GUI. Recently, CAD systems such as CATIA allow calling these operations nearby the representation of the product. The designer does not need anymore to move the mouse towards menus and icons. Operations are thus available within reach of the mouse. In addition, the operations behave semantically: for a given operation selected by the designer, the CAD system may suggest to the designer, still nearby the mouse, a set of new operations according to the former selected operation that the designer is likely to select.

Until recent years, some computer software used, for example in automotive and aerospace industry, are based on geometry, for mechanical engineers to be able to see their work in space or in a three-dimensional displaying.

In this domain, computer software like CATIA, SolidWorks, NX, and ProEngineer allow design geometry in a three dimension space, like respectively shown on FIGS. 1, 2, 3 and 4. On these Figures, the exemplified graphical user interfaces or GUI are typical CAD-like interfaces with standard menu bars. Such menu and toolbars contain a set of user-selectable icons, each icon being associated with one or more operations or functions. Some of these icons are associated with software tools, adapted for editing and/or working on a 3D geometrical modeled product or parts of product such as that displayed in the graphical user interfaces GUI. In the following description, terms "product", "part", "assembly" and the like may be referred to as "part" for the sake of simplicity. The concept of "part" can also be generalized to that of "object". An object encompasses any constituent of the final digital mock-up, for instance, considering an assembly, an object of this assembly can be a sub-assembly, a part, a kinematic joint, a material, the embedded software executed on an Electronic Control Unit (ECU), or any object needed to describe the entire environment of the assembly, like the modeling of the atmosphere in the case you want to study an airplane flying capacities.

Figure 1:
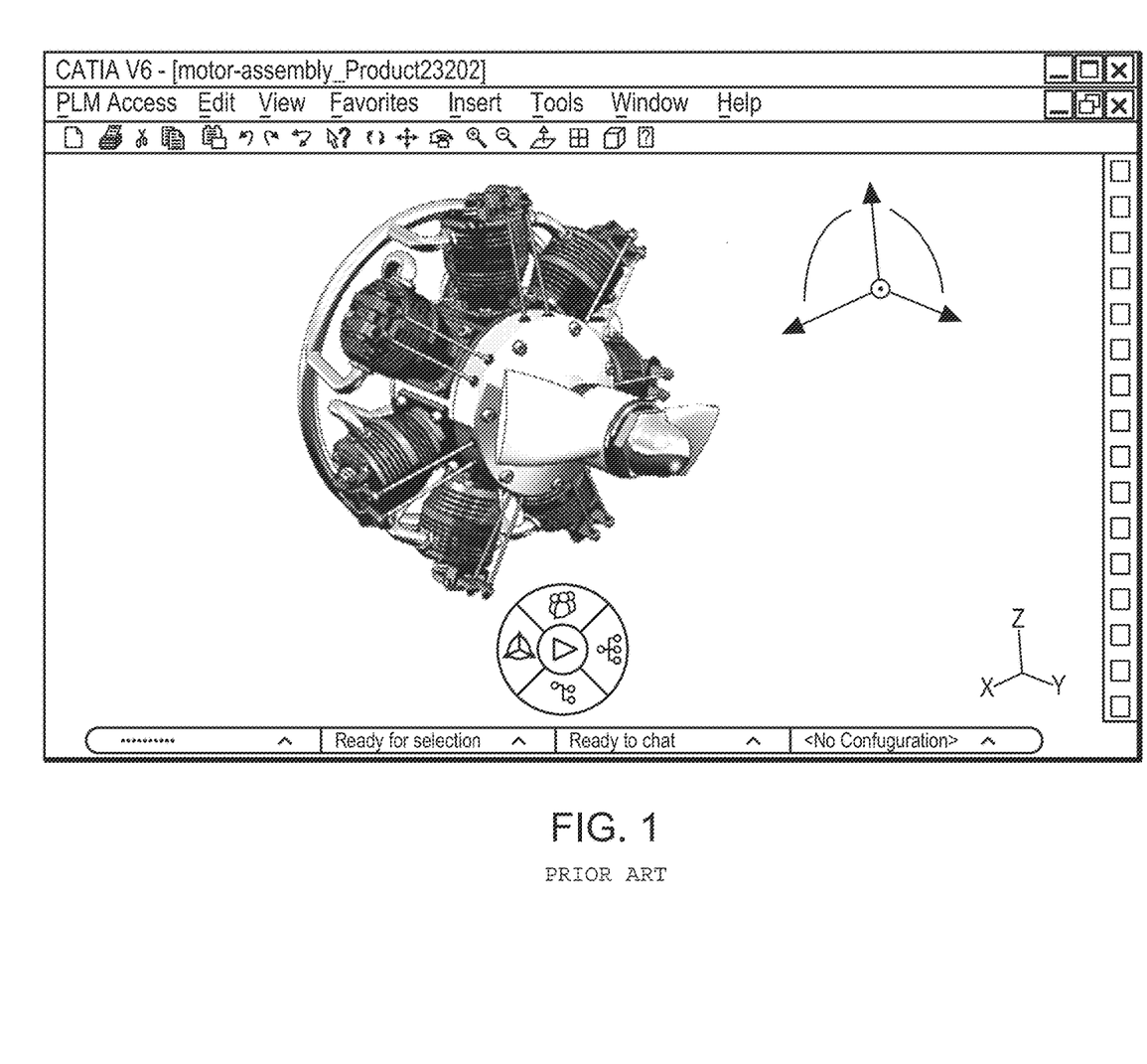
FIGS. 1 to 4 illustrate respectively the following computer software CATIA, SolidWorks, NX, and ProEngineer allowing design geometry in a three dimension space.
Figure 2:
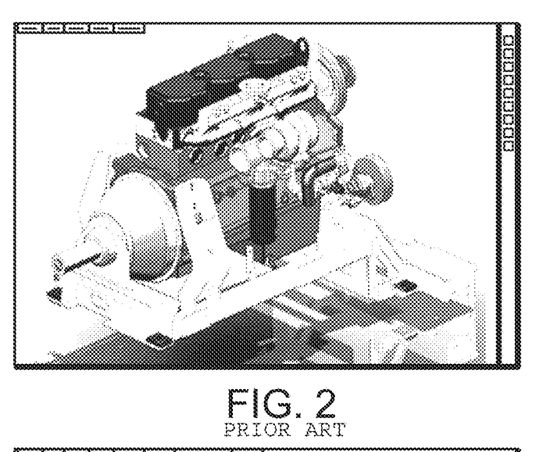
Figure 3:
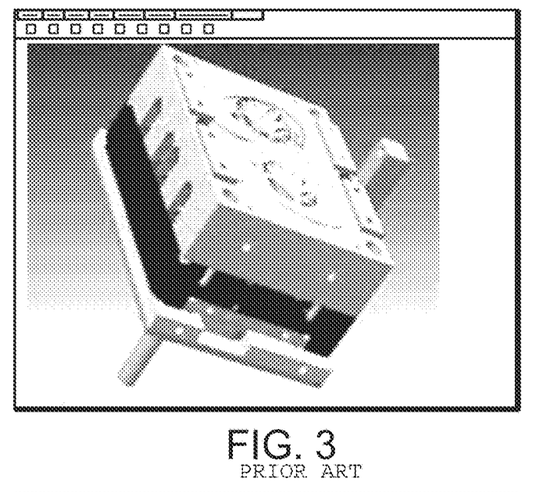
Figure 4:
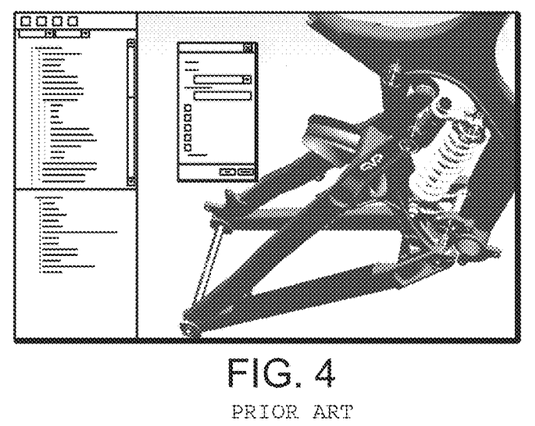
Figure 5:
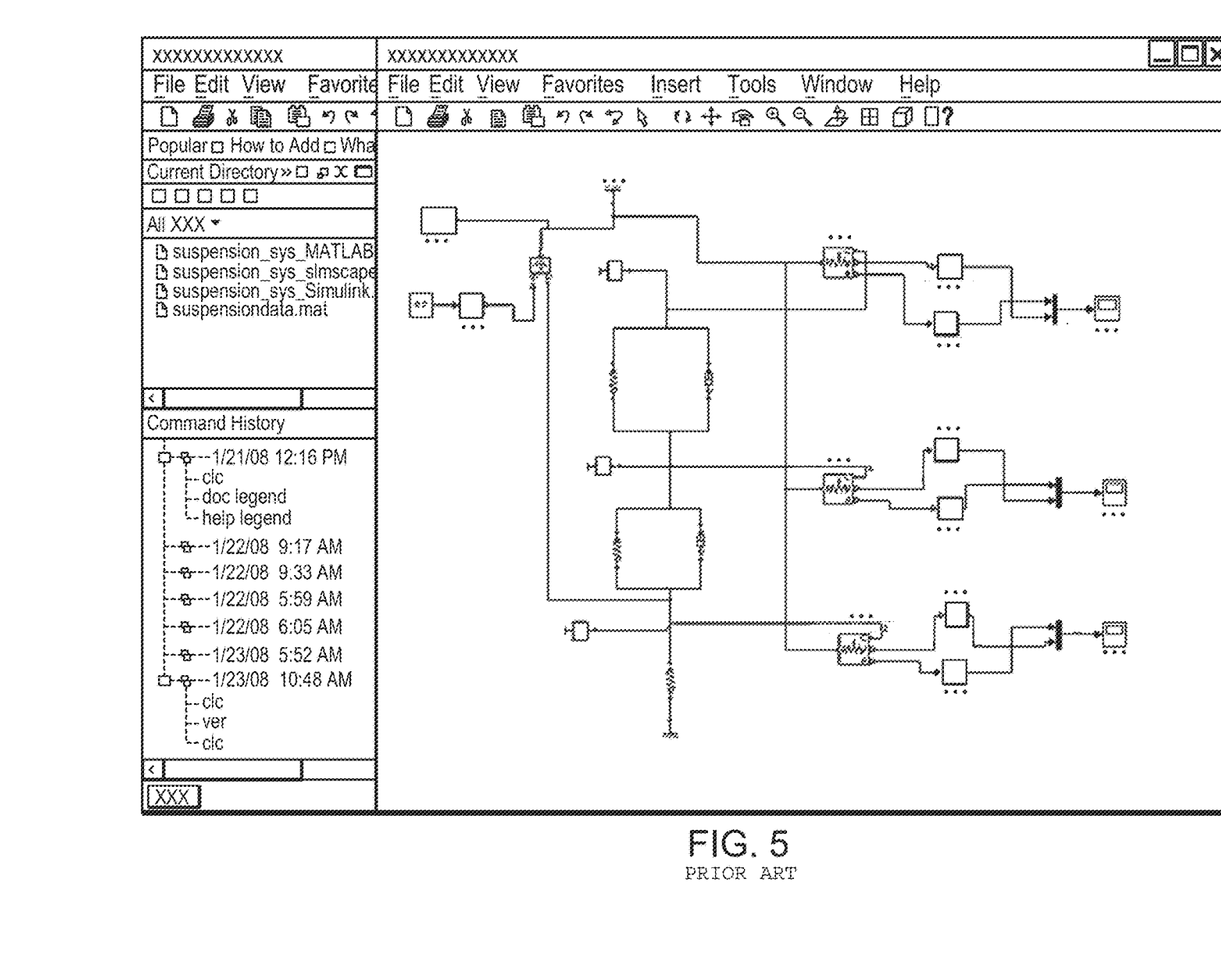
FIGS. 5 to 7 illustrate respectively the following computer software Matlab Simulink, Dymola, and Simulation X, which provide a rich two-dimensional displaying environment to design a logical system from logical components.
Figure 6:
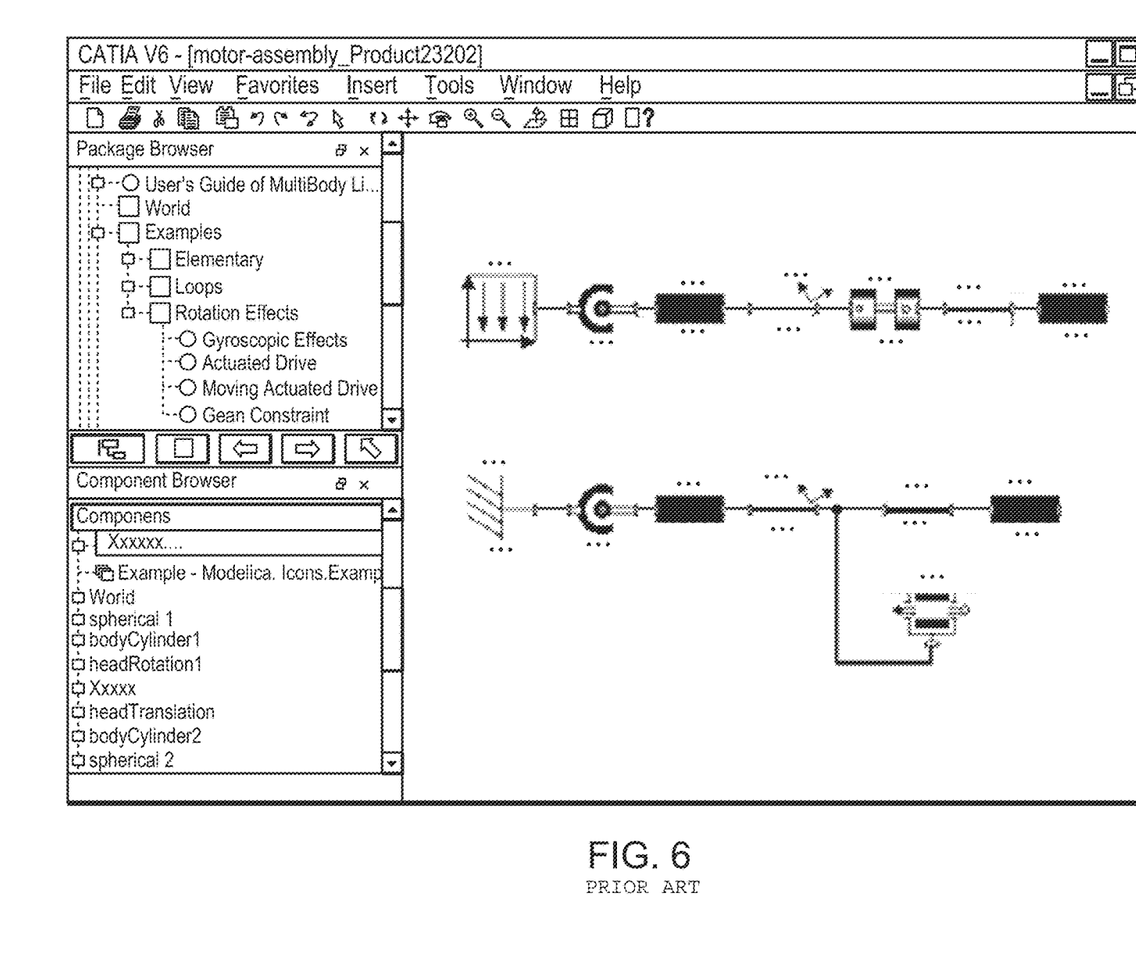
Figure 7:
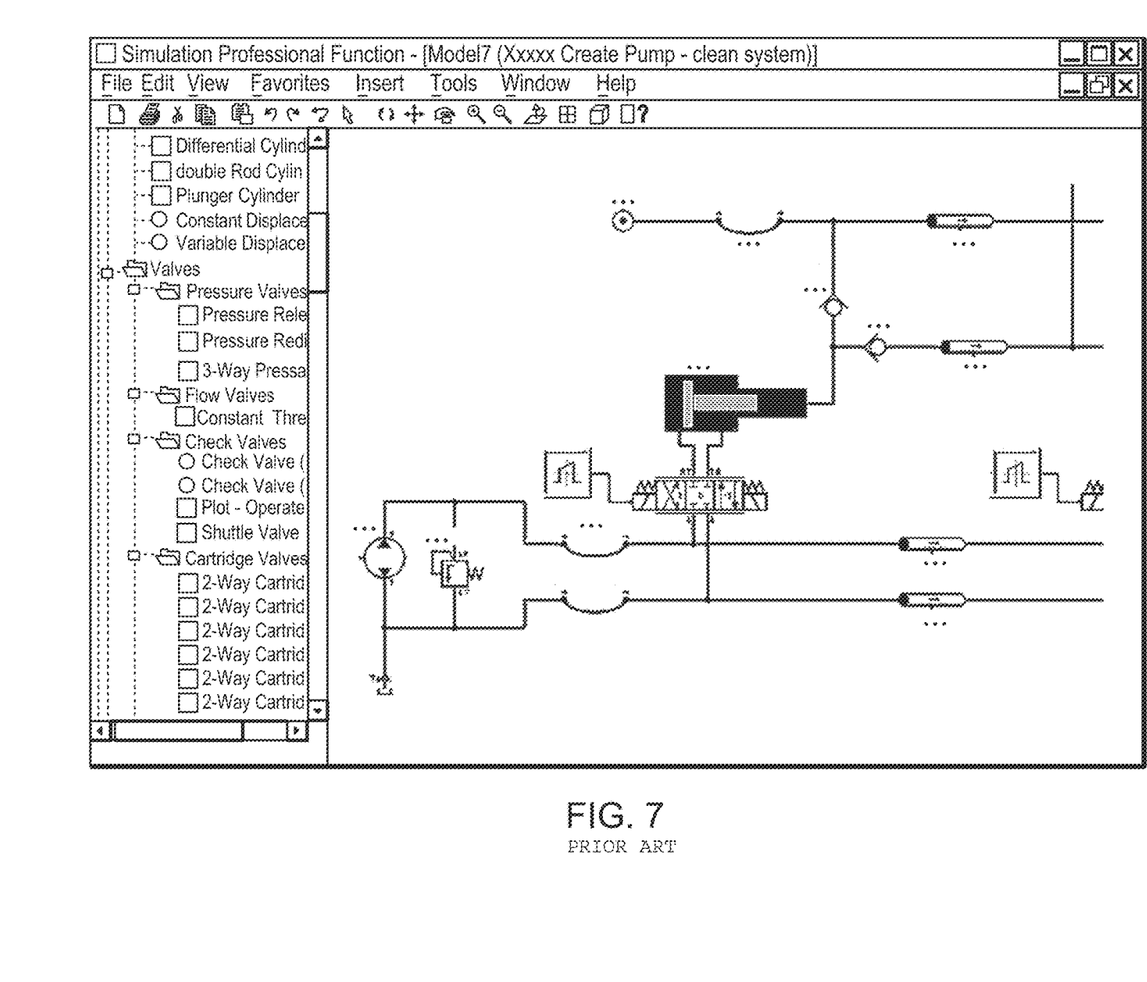

It is still possible to use computer software like Matlab Simulink, Dymola, and Simulation X, which provide a rich two-dimensional displaying environment to design a logical system from logical components, like respectively shown on FIGS. 5, 6 and 7. On these Figures, the exemplified graphical user interfaces or GUI have standard menu bars. Such menu and toolbars contain a set of user-selectable icons, each icon being associated with one or more operations or functions. Some of these icons are associated with software tools, adapted for editing and/or working on a logical modeled product or parts of product such as that displayed in the graphical user interfaces GUI.

Figure 8:
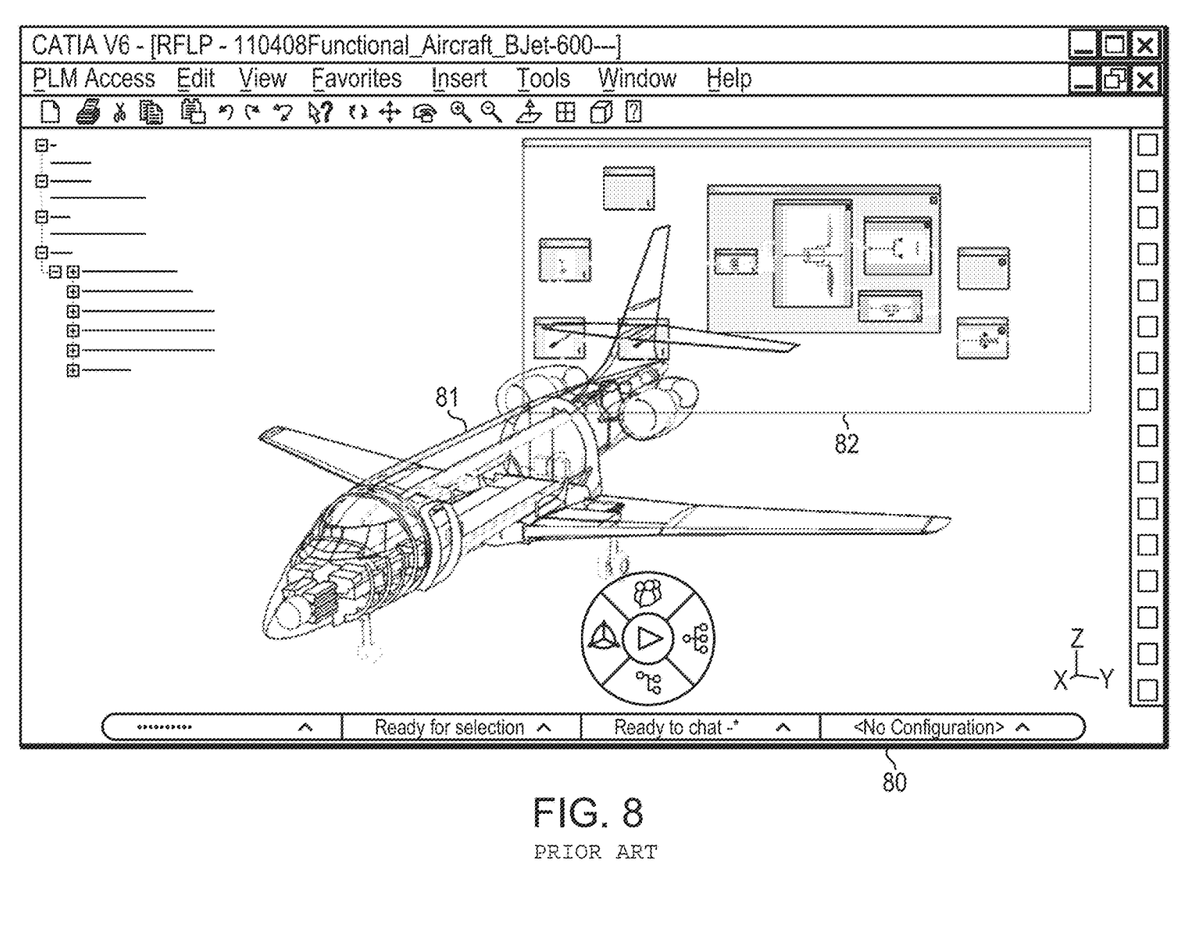
FIG. 8 illustrates computer software CATIA, providing an environment allowing to view and design in the same editor, i.e. on the same screen displaying, a three-dimensional geometrical representation, and separately a logical representation.

In CATIA system, a set of tools provides an environment allowing to view and design in the same editor 80, i.e. on the same screen displaying, a three-dimensional geometrical representation 81 and separately a logical representation 82.

Such displaying of the separate three-dimensional geometrical and logical representations is shown on FIG. 8.

With these kind of systems, understanding how a product or assembly of objects works is really difficult, particularly when the products becomes more and more complex, since it is difficult for a user to see how the mechanical parts interact with the system components, and what information is exchanged between geometrical representation and logical representation.

Thus, there is no link between the used geometrical representation and logical representation.

SUMMARY OF THE INVENTION

Thus, according to the limitations of the existing solutions shortly discussed above, there is a need for improving the recurrent assembly of objects in an easier and faster way such that the productivity of the designer is increased and the design errors minimized.

In other words, there is a need for improving readability, allowing the user to work more efficiently.

It is proposed, according to one aspect of the invention, a computer-implemented method of designing an assembly of objects in a system of computer-aided design, the method comprising the steps of:

providing a three-dimensional geometrical modeled object comprising at least one three-dimensional geometrical element;

providing a logical modeled object comprising at least one logical component;

associating sets of at least one three-dimensional geometrical element with respective sets of at least one logical component;

wherein the method further comprises a step of displaying in a three-dimensional scene, a representation of a set of at least one logical component partially superimposed on the corresponding associated set of at least one three-dimensional geometrical element.

Making a link, both in a technical and a visual manner between the used geometrical and logical representations, allows to the user to work more efficiently, and to improve technical interactions between the technical data representative of the geometric representation and the logical representation.

Such a method allows the user to view and design the complete system in a single three-dimensional environment mixing a three-dimensional geometry representation and a logical representation in the same editor.

Furthermore, the method helps the user to understand the full system behavior by locating the appropriate information directly in three dimensions so that the user can easily understand and design which part of the mechanism is in interaction with the system logical definition and how they interact.

According to an embodiment, the representation of a set of at least one logical component is designed by directly linking in the scene said representation with an anchor point to the corresponding associated set of at least one three-dimensional geometrical element.

Thus, when the user changes the viewing angle of the three-dimensional geometric representation, the components of the logical representation remains anchored with the corresponding three-dimensional geometrical element.

According to an embodiment, the representation of a set of at least one logical component comprising at least one port, or in other words one interface element or connector, is designed by directly linking in the scene a logical component to a corresponding three-dimensional geometrical element.

Such a port allows to link an element of the logical component with a sub-system of the three-dimensional geometrical element, and then improves and facilitates the design of products.

According to an embodiment, displaying a representation of a set of at least one logical component is activable, deactivable, expandable, and zoomable on request.

Thus, the user can choose to temporarily hide elements to focus on his area of interest.

According to an embodiment, displaying a representation of a set of at least one logical component respects the relative depth position in the scene of the corresponding associated set of at least one three-dimensional geometrical element.

Thus, when the user changes the viewing angle of the three-dimensional geometric representation, the displaying of the corresponding components of the logical representation is automatically changed in relation to said change of viewing angle.

In addition, a link could be represented by an extensible leading line.

Thus it is easier to the user to understand a complex product during modifications of the viewing angle of the three-dimensional geometric representation.

The displaying of a representation of a set of at least one logical component can be comprised in a label.

Thus the realization and comprehension is improved.

The invention further proposes a computer program product, stored on a computer readable medium, for designing an assembly of objects in a system of computer-aided design, the computer program comprising code means for causing the system of computer-aided design to take the steps of the method of the invention.

The invention still concerns an apparatus for designing an assembly of objects in a system of computer-aided design, the apparatus comprising means for implementing the steps of the method of the invention.

The invention will be better understood with the study of some embodiments described by way of non-limiting examples below and illustrated by the accompanying drawings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 9:
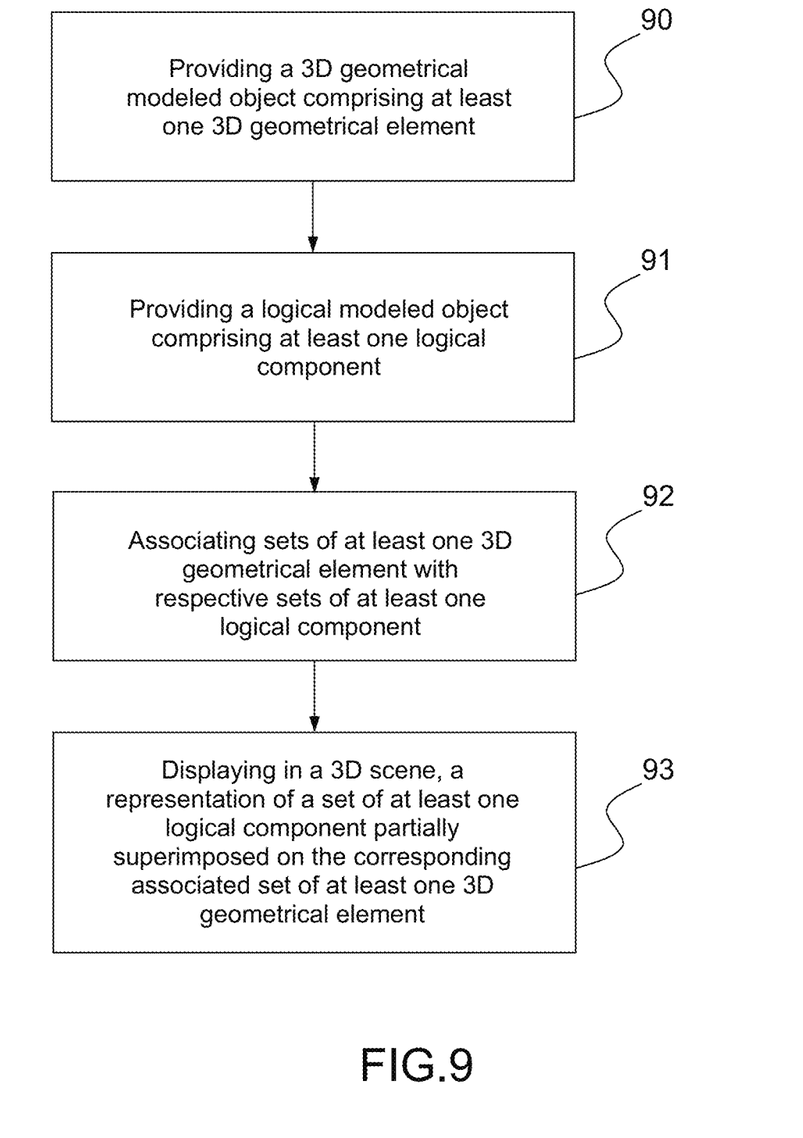
FIG. 9 is a flow diagram that illustrates a method according to an aspect of the invention.

FIG. 9 is a flowchart depicting an embodiment of the invention wherein four blocks are to be seen, pertaining respectively to phases of providing 90 a three-dimensional geometrical modeled object comprising at least one three-dimensional geometrical element, providing 91 a logical modeled object comprising at least one logical component, associating 92 sets of at least one three-dimensional geometrical element with respective sets of at least one logical component, and displaying 93 in a three-dimensional scene, a representation of a set of at least one logical component partially superimposed on the corresponding associated set of at least one three-dimensional geometrical element.

The steps of the method described above can be performed by one or more programmable processors executing a computer program to perform functions of the invention by operating on input data and generating output.

A computer program can be written in any form of programming language, including compiled or interpreted languages, and the computer program can be deployed in any form, including as a stand-alone program or as a subroutine, element or other unit suitable for use in a computing environment. A computer program can be deployed to be executed on one computer or on multiple computers at one site or distributed across multiple sites and interconnected by a communication network.

Following figures explain more in details the functioning of the present invention.

Figure 10:
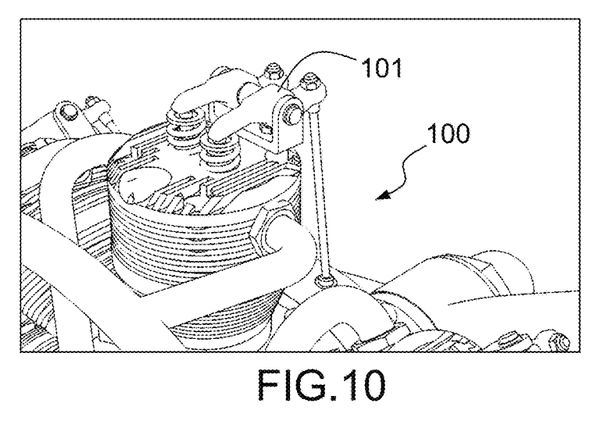
FIGS. 10 to 12 are schematic views that illustrate an example of use of the method according to an aspect of the invention.
Figure 11:
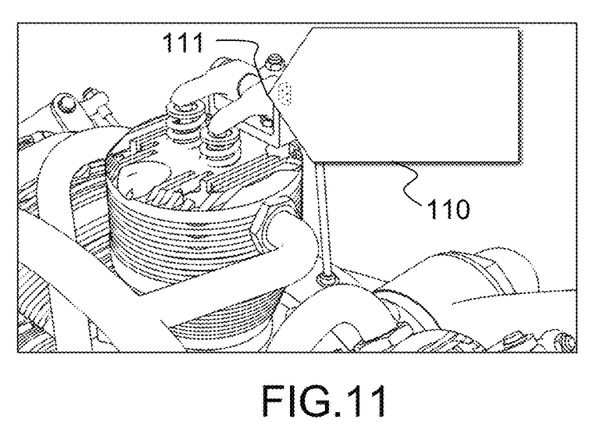
Figure 12:
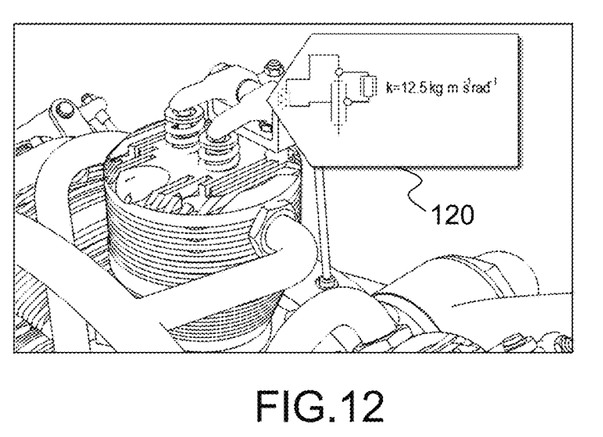

On FIGS. 10 to 12 is represented a first example of use of the method. A user or designer starts from a three-dimensional scene containing geometrical elements. An element is either a part of a mechanical assembly or a relation between those parts. On FIG. 10 is represented a part of a motor 100, and particularly a kinematic joint 101 between several parts that links the parts together and drive motion of the parts.

It is possible, for the designer, to start designing the logical system definition directly from this scene either by defining actuators that act on the mechanical structure and modify its position according to the values given by the logical system, and/or defining sensors that measure physical data, like speed or force, for a control loop for instance.

To do so, the user or designer selects a three-dimensional geometrical entity, on this example a three-dimensional mechanical joint 101, and starts a command that inserts a placeholder 110, for example a label, like illustrated on FIG. 11, to receive the set of logical components in relation with this geometrical element and that interacts with it. By default, the inserted placeholder 110 can be almost empty and contain just a connector to hook more precisely the logical components to the geometrical element (it allows for instance to hook to a particular signal coming from, or going to the mechanical system).

The representation of a set of at least one logical component can be designed by directly linking in the scene said representation with an anchor point 111 to the corresponding associated set of at least one three-dimensional geometrical element. Thus, when the point of view of the assembly of objects is changed by the designer, the logical label remains linked with the set of at least one three-dimensional element during the change.

It is then possible for the designer to design the logical system that is in interaction with the mechanics by putting components, for instance from a library, inside the created empty space 110, and connecting them to the connector, like illustrated on FIG. 12, with a logical diagram in the placeholder (collectively 120).

Then it is really much easier to view and design a mechanical system with the invention, notably thanks to the interaction between three-dimensional geometrical elements and logical components of the mechanical system.

Figure 13:
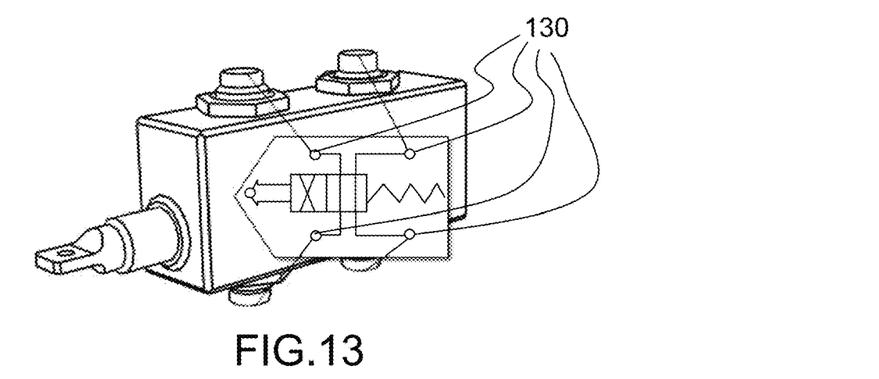
FIGS. 13 and 14 are schematic views illustrating another example of use of the method according to an aspect of the invention.
Figure 14:
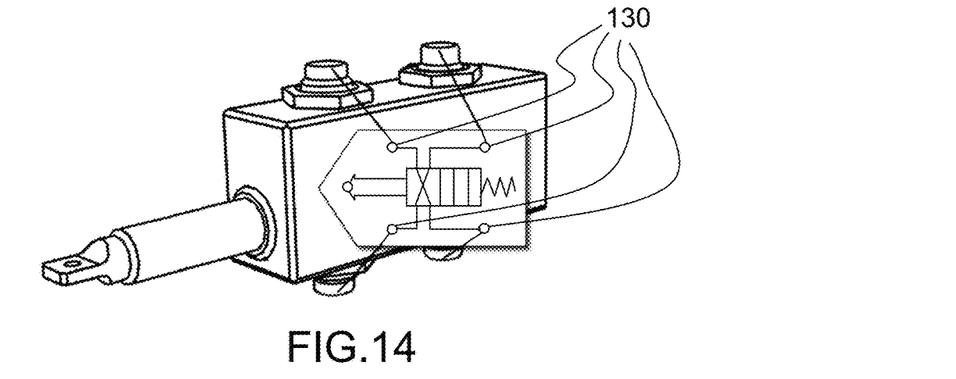

On FIGS. 13 and 14 is represented a second example of use of the method. A user or designer can for example use the invention for a hydraulic valve. It is possible, like on this example, to have ports 130 for directly linking in the scene a logical component to a corresponding three-dimensional geometrical element. In this case, the ports 130 are linked to the hydraulic circuit.

In this example, the logical description shows what flow of oil corresponds to the extracted and retracted position of the drawer.

A link can be represented by an extensible leading line.

Thus the logical diagram representation can be animated and synchronized with the three-dimensional representation animation.

Indeed, FIG. 13 represents the drawer retracted with linked three-dimensional geometrical representation and logical representation, and FIG. 14 represents the drawer extended with linked three-dimensional geometrical representation and logical representation.

Figure 15:
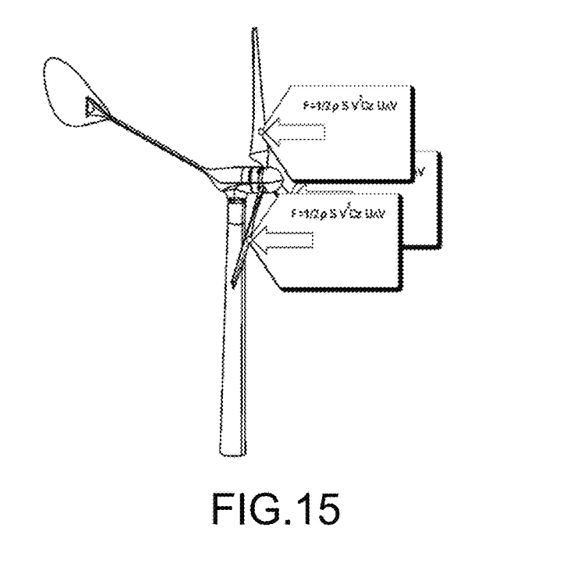
FIG. 15 is a schematic illustration of another example of use of the method according to an aspect of the invention.

On FIG. 15, is represented a third example which is a wind turbine or aeolian well, with several logical diagrams attached to different geometrical elements can be displayed simultaneously. In that case, logical diagrams are displayed according to the depth position in the scene of the associated three-dimensional geometrical element or set of geometrical elements. The logical label corresponding to the closest set of at least one three-dimensional geometrical element in the scene is displayed on top of others one, and so on when the depth increases.

Figure 16:
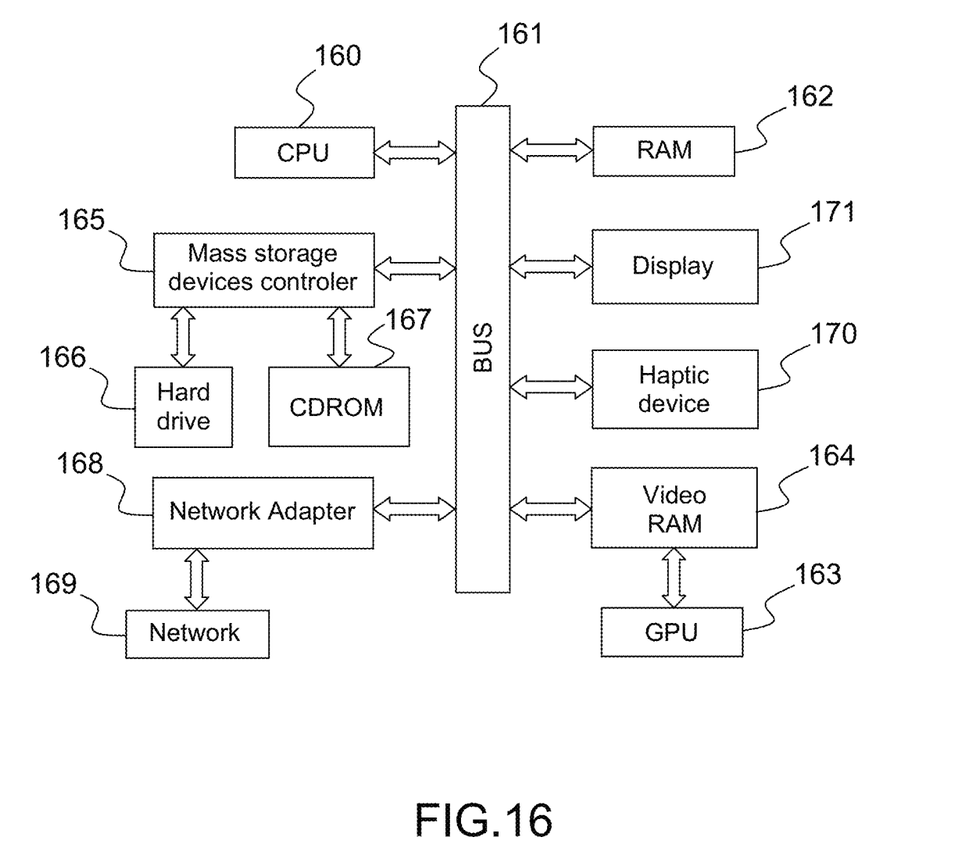
FIG. 16 is a schematic view of a hardware and software environment adapted for carrying out the invention.

FIG. 16 shows a client computer system, for instance a workstation of a user designing an assembly of objects according to principles of the invention. The client computer comprises a central processing unit or CPU 160 connected to an internal communication BUS 161, a random access memory or RAM 162 also connected to the BUS 161. The client computer system is further provided with a graphical processing unit or GPU 163 which is associated with a video random access memory 164 connected to the communication BUS 161. Video RAM 164 is also known in the art as frame buffer. A mass storage device controller 165 manages accesses to a mass memory device, such as hard drive 166. Mass memory devices suitable for tangibly embodying computer program instructions of the present invention (e.g. methods of FIGS. 9-15) and data include all forms of nonvolatile memory, including by way of example semiconductor memory devices, such as EPROM, EEPROM, and flash memory devices; magnetic disks such as internal hard disks and removable disks; magnetooptical disks; and CD-ROM disks 167. One or more of said mass memory devices form or implement computer program product embodiments of the present invention. Any of the foregoing may be supplemented by, or incorporated in, specially designed ASICs (application-specific integrated circuits). A network adapter 168 manages accesses to a network 169. The client computer system may also include a haptic device 170 such as cursor control device, a keyboard or the like. A cursor control device is used in the client computer to permit the user to selectively position a cursor at any desired location on display 171. In addition, the cursor control device allows the user to select various commands, and input control signals. The cursor control device includes a number of signal generation devices for input control signals to system. Typically, a cursor control device may be a mouse, the button of the mouse being used to generate the signals.

The preferred embodiment of the present invention has been described. It will be understood that various modifications may be made without departing from the spirit and scope of the invention. Therefore, other implementations are within the scope of the following claims. For instance, the ranking of the criteria may depend on the technical context of the assembly.

What is claimed is:

1. A computer-implemented method of designing an assembly of objects, the method comprising the steps of:
   providing a three-dimensional geometrical model of an object of the assembly of objects in a computer system of computer aided design (CAD), the three-dimensional geometrical model comprising at least one three-dimensional geometrical element and stored in a memory device, each three-dimensional geometrical element having an anchor point;
   providing a logical model of said object describing behavior of the object within the assembly, the logical model comprising at least one logical component and stored in said memory device;
   associating at least one three-dimensional geometrical element of the three-dimensional geometrical model of the object with at least one respective logical component of the logical model;
   displaying, on a screen, a three-dimensional scene comprising a representation of said logical component partially superimposed on the corresponding associated three-dimensional geometrical element, a location of the logical component being linked to the anchor point of the corresponding three-dimensional geometric element; and
   computing and displaying, on the screen, synchronous animations of the representation of the logical component and the corresponding associated three-dimensional geometrical element, said animations providing a dynamic illustration of a calculated behavior of the corresponding object within the assembly.

2. The method of claim 1, further comprising designing the representation of the at least one logical component by directly linking in the scene said representation with an anchor point to the corresponding associated three-dimensional geometrical element.

3. The method of claim 1, wherein the representation of the logical component comprises at least one port and is designed by directly linking in the scene the logical component to the corresponding three-dimensional geometrical element.

4. The method of claim 1, wherein the representation of the logical component is activable, deactivable, expandable, and zoomable on request.

5. The method as claimed in claim 1, wherein the representation of the logical component respects a relative depth position in the scene of the corresponding associated three-dimensional geometrical element, the method further comprising changing a point of view of the scene and automatically adapting the representation of the logical component such that it remains partially superimposed on the corresponding associated three-dimensional geometrical element.

6. The method as claimed in claim 1 further comprising displaying, in the three-dimensional scene, a link between the representation of a logical element and that of the corresponding associated three-dimensional geometrical element, the link being represented by an extensible leading line.

7. The method as claimed in claim 1, wherein the representation of the logical component is comprised in a label.

8. A computer program product, for designing an assembly of objects in a system of computer-aided design, comprising:
   a non-transitory computer readable medium storing a computer program supporting the system of computer-aided design;
   the computer program comprising code for causing the system of computer-aided design (CAD) to:
      provide a three-dimensional geometrical model of an object of the assembly of objects in the system of CAD, the three-dimensional geometrical model comprising at least one three-dimensional geometrical element and stored in a memory device, each three-dimensional geometrical element having an anchor point;
      provide a logical model of said object describing behavior of the object within the assembly, the logical model comprising at least one logical component and stored in said memory device;
      associate at least one three-dimensional geometrical element of the three-dimensional geometrical model of the object with at least one respective logical component of the logical model;
      display on a screen of a computer a three-dimensional scene comprising a representation of the logical component partially superimposed on the corresponding associated three-dimensional geometrical element, a location of the logical component being linked to the anchor point of the corresponding three-dimensional geometrical element; and
      compute and displaying, on the screen, synchronous animations of the representation of the logical component and the corresponding associated three-dimensional geometrical element, said animations providing a dynamic illustration of a calculated behavior of the corresponding object within the assembly.

9. The computer program product of claim 8, further comprising code for designing the representation of the logical component by directly linking in the scene said representation with an anchor point to the corresponding associated three-dimensional geometrical element.

10. The computer program product of claim 8, wherein the representation of the logical component comprises at least one port and is designed by directly linking in the scene the logical component to the corresponding three-dimensional geometrical element.

11. The computer program product of claim 8, wherein display of the representation of the logical component is activable, deactivable, expandable, and zoomable on request.

12. The computer program product as claimed in claim 8, wherein display of the representation of the logical component respects a relative depth position in the scene of the corresponding associated three-dimensional geometrical element, the computer program also comprising code for causing the system of the computer-aided design to allow a user to change a point of view of the scene, and automatically adapting the representation of the logical component such that it remains partially superimposed on the corresponding associated three-dimensional geometrical element.

13. The computer program product as claimed in claim 8 further comprising code for causing the system of computer-aided design to display a link in the three-dimensional scene, wherein the link is represented by an extensible leading line.

14. The computer program product as claimed in claim 8, wherein display of the representation of the logical component is comprised in a label.

15. An apparatus for designing an assembly of objects in a system of computer-aided design, the apparatus comprising:
   a non-transitory computer memory device storing a three-dimensional geometrical model of an object of the assembly of objects in the system of computer-aided design (CAD), the three-dimensional geometrical model comprising at least one three-dimensional geometrical element, each three-dimensional geometrical element having an anchor point;
a non-transitory memory device storing a logical model of said object describing behavior of the object within the assembly, the logical model comprising at least one logical component;
a computer processor for associating the at least one three-dimensional geometrical element of the three-dimensional geometrical model with the respective logical component of the logical model; and
a computer display for displaying a three-dimensional scene comprising a representation of said logical component partially superimposed on the corresponding associated three-dimensional geometrical element, a location of the logical component being linked to the anchor point of the corresponding three-dimensional geometrical element, and for computing and displaying, on the computer display, synchronous animations of the representation of the logical component and the corresponding associated three-dimensional geometrical element, said animations providing a dynamic illustration of a calculated behavior of the corresponding object within the assembly.

16. A computer-implemented method of designing an assembly of objects, the method comprising:
providing a three-dimensional geometrical model of an object of the assembly of objects in a computer system of computer aided design (CAD), the three-dimensional geometrical model comprising at least one three-dimensional geometrical element and stored in a memory device, each three-dimensional geometrical element having an anchor point;
providing a logical model of said object describing behavior of the object within the assembly, the logical model comprising at least one logical component and stored in said memory device;
associating at least one three-dimensional geometrical element of the three-dimensional geometrical model of the object with at least one respective logical component of the logical model;
displaying, on a screen, a three-dimensional scene comprising a representation of said logical component geometrical element, wherein the representation of the logical component respects a relative depth position in the scene of the corresponding associated three-dimensional geometrical element, a location of the logical component being linked to the anchor point of the corresponding three-dimensional geometrical element; and
changing a point of view of the scene, and, in response to changing the point of view of the scene, adapting the representation of the logical component such that it remains partially superimposed on the corresponding associated three-dimensional geometrical element;
said steps being carried out by a computer, within a system of computer aided design.

17. A computer program product, for designing an assembly of objects in a system of computer-aided design, comprising:
a non-transitory computer readable medium storing a computer program supporting the system of computer-aided design;
the computer program comprising code for causing the system of computer-aided design to:

provide a three-dimensional geometrical model of an object of the assembly of objects in a computer system of computer aided design (CAD), the three-dimensional geometrical model comprising at least one three-dimensional geometrical element and stored in a memory device, each three-dimensional geometrical element having an anchor point;
provide a logical model of said object describing behavior of the object within the assembly, the logical model comprising at least one logical component and stored in the memory device;
associate at least one three-dimensional geometrical element of the three-dimensional geometrical model of the object with at least one respective logical component of the logical model;
display, on a screen of a computer, a three-dimensional scene comprising a representation of the logical component partially superimposed on the corresponding associated three-dimensional geometrical element, wherein the representation of the logical component respects a relative depth position in the scene of the corresponding associated three-dimensional geometrical element, a location of the logical component being linked to the anchor point of the corresponding three-dimensional geometrical element; and
change a point of view of the scene, and, in response to changing the point of view of the scene, automatically adapt the representation of the logical component such that it remains partially superimposed on the corresponding associated three-dimensional geometrical element.

18. An apparatus for designing an assembly of objects in a system of computer-aided design, the apparatus comprising:
a non-transitory computer memory device storing a three-dimensional geometrical model of an object of the assembly of objects in a computer system of computer aided design (CAD), the three-dimensional geometrical model comprising at least one three-dimensional geometrical element, each three-dimensional geometrical element having an anchor point;
a non-transitory memory device storing a logical model of said object describing behavior of the object within the assembly, the logical model comprising at least one logical component;
a computer processor for associating the at least one three-dimensional geometrical element of the three-dimensional geometrical model with the respective logical component of the logical model; and
a computer display for displaying a three-dimensional scene comprising a representation of said logical component partially superimposed on the corresponding associated three-dimensional geometrical element, respecting a relative depth position in the scene of the corresponding associated three-dimensional geometrical element, a location of the logical component being linked to the anchor point of the corresponding three-dimensional geometrical element;
the computer processor and the computer display being configured for allowing a user to change a point of view of the scene, and for, in response to changing the point of view of the scene, automatically adapting the representation of the logical component such that it remains partially superimposed on the corresponding associated three-dimensional geometrical element.

* * * * *